Dec. 30, 1947.　　　J. A. FOTIE　　　2,433,354

WELDING ASSEMBLY

Filed Dec. 27, 1943

INVENTOR.
Joseph A. Fotie
BY
ATTORNEY.

Patented Dec. 30, 1947

2,433,354

UNITED STATES PATENT OFFICE 2,433,354

WELDING ASSEMBLY

Joseph A. Fotie, Kansas City, Mo.

Application December 27, 1943, Serial No. 515,741

3 Claims. (Cl. 219—4)

My invention relates to new and useful improvements in welding machines.

At the present time it is the usual practice to employ separate machines to perform projection welding and spot welding operations. Besides being expensive the machines occupy and require considerable space in the plant.

I have developed a single welding assembly that can be used either as a spot welder or as a projection welder. My construction embodies upper and lower welding elements which are fitted with interchangeable welding dies and electrodes. Specifically, a novel two-part head is substituted for the usual upper electrode or die so that it is vertically reciprocated by the rocker arm or lever. Clamped between the two parts of the head is a horizontally adjustable horn. A vertically adjustable electrode is removably carried by the horn and a suitable die is detachably secured to one of the head parts. In place of the conventional stationary lower horn I provide a reversible horn having provision for detachably mounting a spot welding electrode at one end and a suitable die at the other end. To perform a spot welding operation the upper and lower horns are positioned with electrodes at their outer ends and the horns adjusted so that the upper and lower electrodes are in vertical alignment and in position to register when brought together. Furthermore, the electrode should be adjusted to clear the upper die if the die is not removed. To convert the machine for projection welding the upper electrode is raised or removed and a suitable die attached to the head; the lower electrode is removed from its horn and the horn reversed and a lower welding die attached thereto. In other words, when equipped for projection welding, the head and lower horn are provided with dies in place of the electrodes used in spot welding. All of the above adjustments can be easily and expeditiously made.

Figure 1:
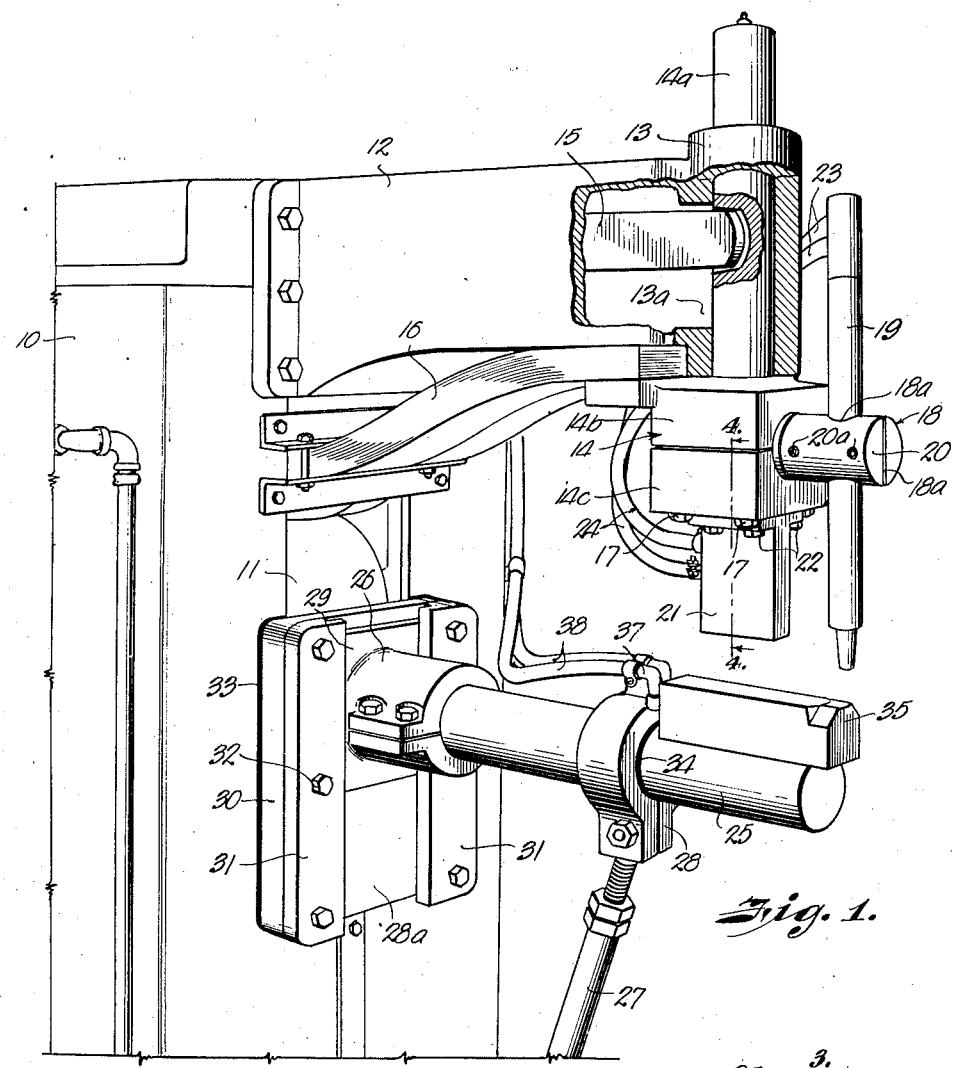
Figure 2:
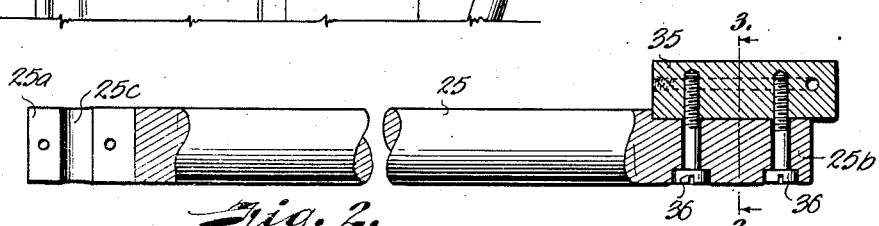
Figure 3:
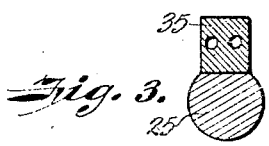
Figure 4:
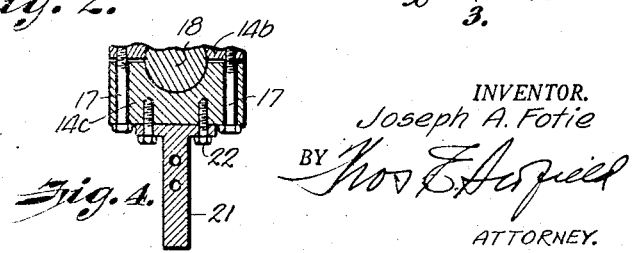

In the drawing forming part of this specification and wherein like numerals are employed to designate like parts throughout the same, Figure 1 is a front perspective view of a welding machine embodying my invention, parts being broken away and shown in section for clearness of illustration, Figure 2 is a side elevation of the lower welding horn with parts broken away, the horn removed from the bearing support and equipped with a die for projection welding, Figure 3 is a vertical sectional view taken on the line 3—3 of Figure 2, and Figure 4 is a fragmentary vertical sectional view taken on the line 4—4 of Figure 1.

In the drawing, wherein for the purpose of illustration is shown a preferred embodiment of my invention, I have shown a welding machine having a case 10 which houses a transformer 11 and some of the actuating mechanism. Mounted at the upper end of case 10 is U-shaped support 12 having a bearing 13 at its outer end in which is journaled the shank 14a of a welding head 14. Welding head 14 is reciprocated by a pivoted lever 15 actuated by mechanism within the case 10. The forward end of lever 15 enters a socket in shank 14a through a vertically elongated slot 13a. Welding current from the transformer 11 is supplied to the head by a flexible conductor 16. Welding head 14 consists of upper and lower blocks 14b and 14c drawn together by bolts 17 to securely hold an upper horn 18 therebetween. At its end horn 18 is split centrally and one of the halves separated from the horn to form a clamping plate 20. The halves are grooved to form a hole 18a in which is placed the upper electrode 19. The electrode 19 is adjusted by manipulation of bolts 20a which hold the clamping plate 20 on the horn proper. A die 21 suitable for projection welding is removably attached to the lower block 14c by bolts 22, as best shown in Figure 4. Cooling water is supplied to the electrode 19 through tubing 23 and to die 21 through tubing 24 in the conventional manner.

The lower horn 25 is supported at its inner end by a split bearing 26 and adjacent its outer end by a support 27 and split collar 28. Horn 25 is vertically adjustable to accommodate work of varying shape and thickness. An end plate 29 integral with bearing 26 is vertically slidable in a guideway formed by base 30 and clamping bars 31. Bearing 26 is held in a selected adjusted position by tightening bolts 32 which hold the clamping bars 31 on base 30. Welding current from transformer 11 is supplied to horn 25 in the conventional manner. A conductor from the transformer is electrically connected to base 30 which carries the current to horn 25 through end plate 29 and bearing 26. Base 30 is insulated from the case 10 by strips of insulating material 33 and split collar 28 is separated from horn 25 by an insulating lining 34.

As best shown in Figure 2, horn 25 is adapted to mount a spot welding electrode (not shown) at the end 25a thereof and to mount a projection welding die 35 at end 25b. The electrode is mounted in horn 25 at 25c in the same manner as the upper electrode 19 is mounted in horn 20.

The die 35 is detachably secured to the horn by bolts 36. If the machine is to be used as a projection welder, die 35 is attached to the horn 25 and the end 25a of the horn is secured in bearing 26. When the machine is to be used as a spot welder, end 25b of the horn is inserted in bearing 26 and an electrode is attached to its other end. Fittings 37 at the terminal ends of water supply tubes 38 may be attached to either the spot welding electrode or the projection welding die.

The horn 25 is reversible end for end and is positioned in its supports according to the particular welding operation to be performed.

It is to be understood, of course, that the dies 21 and 35 are merely typical of the dies adaptable for one type of projection welding. Such dies may vary in size and shape according to the particular operation they are adapted to perform and the particular shape of the object to be welded. The welding assembly which I have here shown is inexpensive to manufacture and serves the purpose of both projection welder and a spot welder. It can be easily converted from one form to the other and requires no more space than the conventional welding machine.

It is to be understood that the form of the invention herewith shown and described is to be taken as a preferred embodiment of the same and that various changes in the size, shape and arrangement of parts may be resorted to without departing from the spirit of my invention or the scope of the appended claims.

Having thus described my invention, I claim:

1. In a welding assembly for both projection and spot welding operations the improvement comprising upper and lower welding elements adapted to detachably receive projection welding dies and spot welding electrodes; one of said elements formed with a two-part welding head, and a horn clamped between the parts of the head, said die being detachably secured to one of the head parts.

2. In a welding assembly for both projection and spot welding operations the improvement comprising upper and lower welding elements adapted to detachably receive projection welding dies and spot welding electrodes; one of said elements formed with a two-part welding head, and a horizontally adjustable horn clamped between the parts of the head, said electrode being vertically adjustable and carried by the horn and said die being detachably secured to one of the head parts.

3. In a welding assembly for both projection and spot welding operations the improvement comprising upper and lower welding elements adapted to detachably receive projection welding dies and spot welding electrodes; one of said elements formed with a two-part welding head, and a horn clamped between the parts of the head, said electrode being carried by the horn and said die being carried by one of the head parts; the other of said elements including a horn for receiving said dies and electrodes, and means detachably but rigidly supporting the horn.

JOSEPH A. FOTIE.

REFERENCES CITED

The following references are of record in the file of this patent:

UNITED STATES PATENTS

| Number | Name | Date |
|---|---|---|
| 1,635,582 | Meadowcroft (1) | July 12, 1927 |
| 1,767,473 | Paugh | June 24, 1930 |
| 1,794,789 | Meadowcroft (2) | Mar. 3, 1931 |
| 2,130,657 | Watkin | Sept. 20, 1938 |
| 2,260,866 | Powell | Oct. 28, 1941 |
| 1,154,470 | Winfield et al. | Sept. 21, 1915 |
| 2,276,770 | Green | Mar. 17, 1942 |
| 2,310,556 | Strong | Feb. 9, 1943 |